US011334314B2

(12) United States Patent
Kulavik et al.

(10) Patent No.: US 11,334,314 B2
(45) Date of Patent: May 17, 2022

(54) NETWORKED GAMING HEADSET WITH AUTOMATIC SOCIAL NETWORKING

(71) Applicant: Voyetra Turtle Beach, Inc., White Plains, NY (US)

(72) Inventors: Richard Kulavik, San Jose, CA (US); Michael Jessup, San Jose, CA (US); Kevin Arthur Robertson, San Jose, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 820 days.

(21) Appl. No.: 14/477,480

(22) Filed: Sep. 4, 2014

(65) Prior Publication Data
US 2015/0121230 A1 Apr. 30, 2015

Related U.S. Application Data

(60) Provisional application No. 61/895,467, filed on Oct. 25, 2013.

(51) Int. Cl.
*G06F 3/16* (2006.01)
*H04L 29/08* (2006.01)
*G10L 15/00* (2013.01)
*G10L 15/30* (2013.01)
*H04L 29/06* (2006.01)
*H04L 67/50* (2022.01)
*H04L 67/131* (2022.01)
*A63F 13/87* (2014.01)

(52) U.S. Cl.
CPC .............. *G06F 3/167* (2013.01); *G10L 15/00* (2013.01); *G10L 15/30* (2013.01); *H04L 67/22* (2013.01); *H04L 67/38* (2013.01); *A63F 13/87* (2014.09)

(58) Field of Classification Search
CPC ......... G06F 3/167; G10L 15/30; G10L 15/00; H04L 67/22; H04L 67/38; A63F 13/87
See application file for complete search history.

(56) References Cited

U.S. PATENT DOCUMENTS 9,666,187 B1 * 5/2017 Pinsky .................... G10L 15/22
2002/0071577 A1 * 6/2002 Lemay .............. H04N 5/44582
381/110
2009/0197681 A1 * 8/2009 Krishnamoorthy ..... A63F 13/12
463/42
(Continued)

Primary Examiner — Justin R. Blaufeld
(74) Attorney, Agent, or Firm — McAndrews, Held & Malloy, Ltd.

(57) ABSTRACT

In an audio setup comprising at least one audio headset configurable to process audio for a user (e.g., when participating in an online multiplayer game), input audio and/or output audio in the audio headset may be monitored, and when the audio matches triggering criteria, one or more update messages may be triggered via a social networking service. The triggering criteria may comprise (or be set based on) identity of the speaker, content of the audio, and/or conditions association with the audio. Different triggering criteria may be associated with different applications (e.g., different video games). The update messages may be made available to one or more other users, who may be selected based on matching particular user selection criteria and/or based on successful user validation. The user selection criteria may comprise participation in the same online multiplayer game.

20 Claims, 11 Drawing Sheets

(56) References Cited

U.S. PATENT DOCUMENTS

2013/0346867 A1* 12/2013 Woods ................... G11B 27/34
                                                    715/728
2014/0006028 A1*  1/2014 Hu ......................... G10L 17/04
                                                    704/251
2014/0372892 A1* 12/2014 Payzer .................... G06F 3/167
                                                    715/728

* cited by examiner

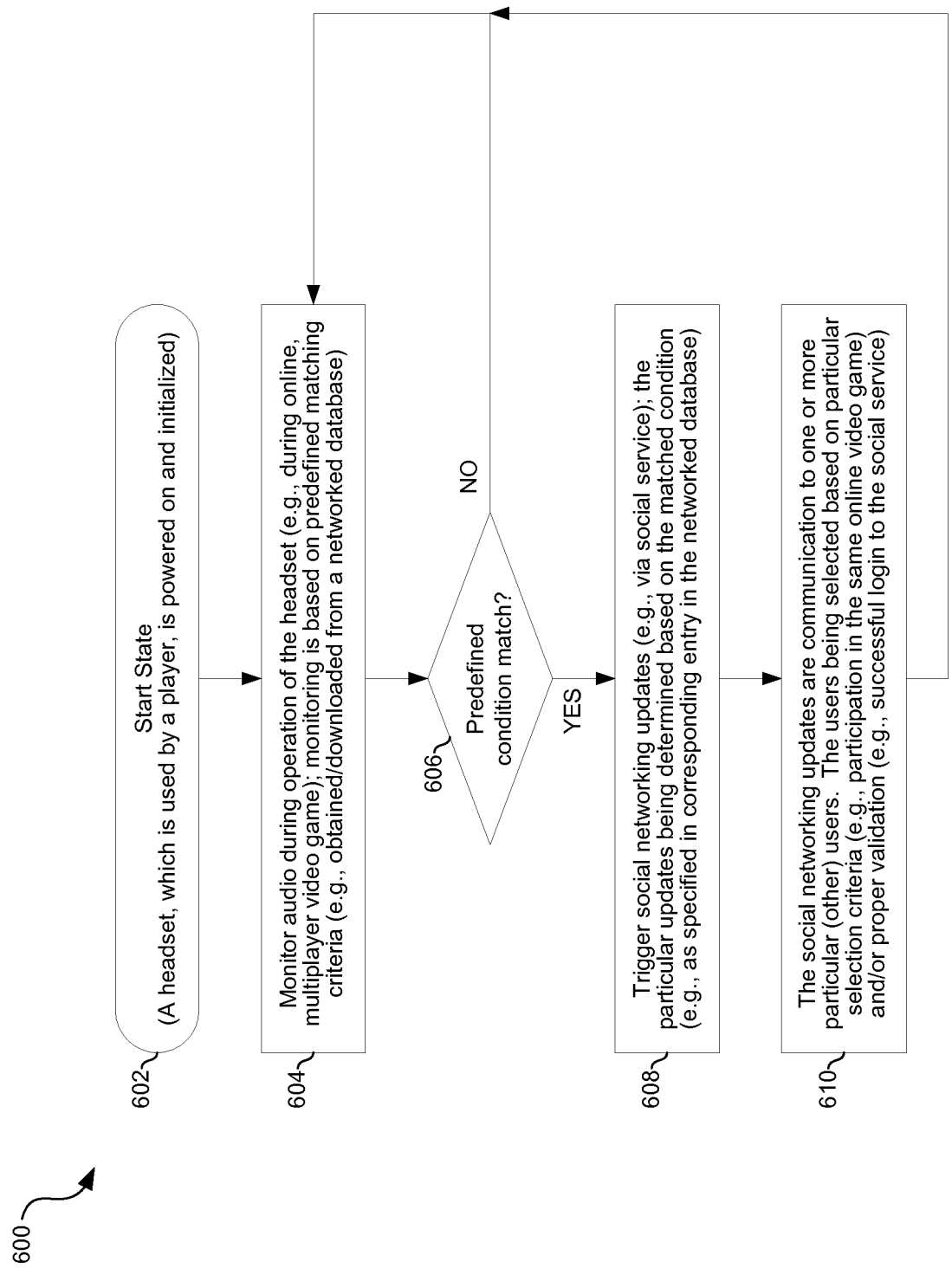

NETWORKED GAMING HEADSET WITH AUTOMATIC SOCIAL NETWORKING

CLAIM OF PRIORITY

This patent application makes reference to, claims priority to and claims benefit from the U.S. Provisional Patent Application No. 61/895,467, filed Oct. 25, 2013 and titled "Networked Gaming Headset With Automatic Social Networking," which is hereby incorporated herein by reference in its entirety.

INCORPORATION BY REFERENCE

The entirety of each of the following applications is hereby incorporated herein by reference: U.S. patent application Ser. No. 13/040,144 titled "Networked gaming headset with Programmable Audio" and published as US2012/0014553. The above stated application(s) is hereby incorporated herein by reference in its entirety.

TECHNICAL FIELD

Aspects of the present application relate to electronic gaming. More specifically, to methods and systems for networked gaming headset with automatic social networking.

BACKGROUND

Limitations and disadvantages of conventional approaches to audio processing for gaming will become apparent to one of skill in the art, through comparison of such approaches with some aspects of the present method and system set forth in the remainder of this disclosure with reference to the drawings.

BRIEF SUMMARY

Methods and systems are provided for networked gaming headset with automatic social networking, substantially as illustrated by and/or described in connection with at least one of the figures, as set forth more completely in the claims.

BRIEF DESCRIPTION OF THE DRAWINGS

FIG. 6 is a flowchart illustrating an example process for providing automatic social networking in a networked gaming headset.

DETAILED DESCRIPTION

Figure 1A:
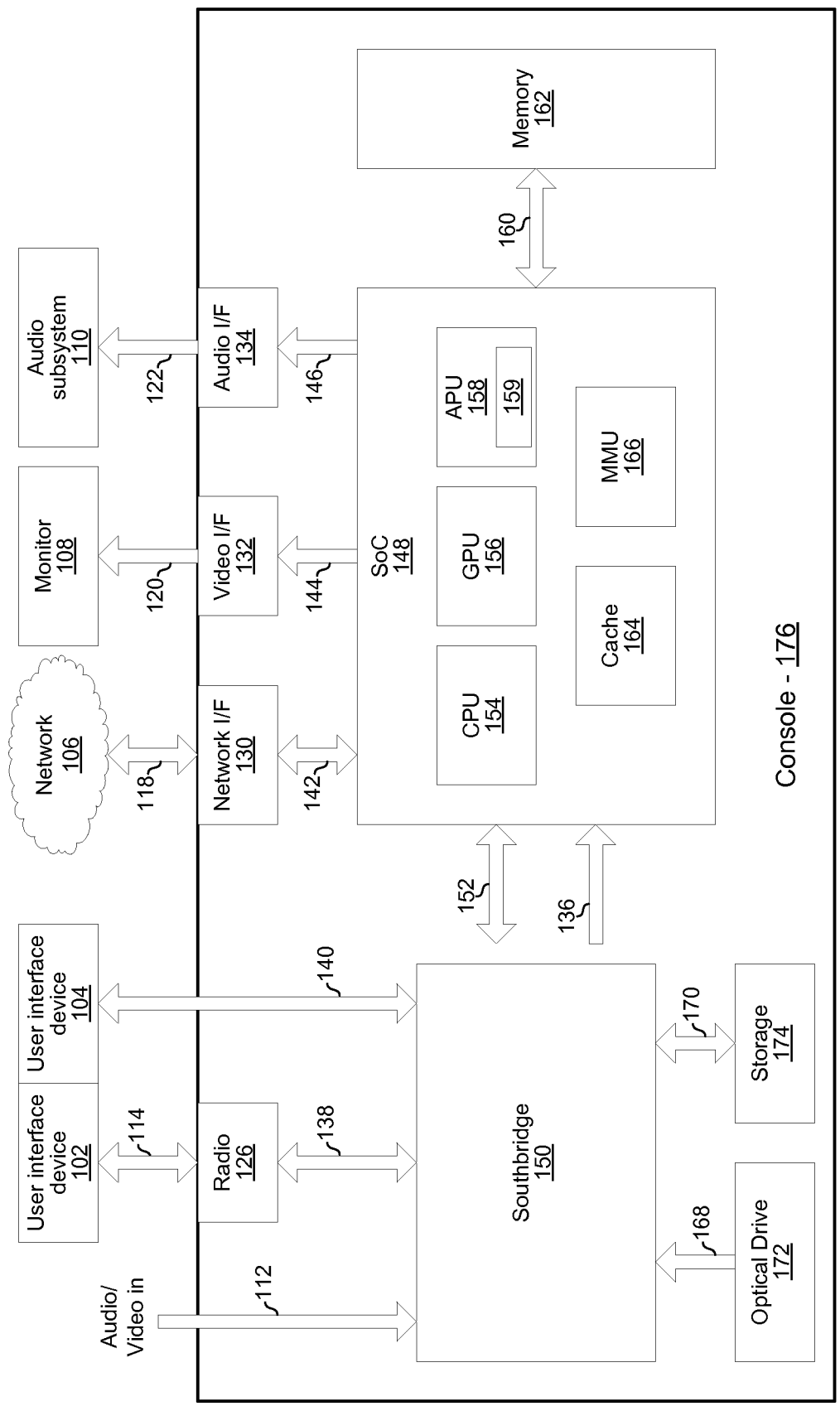
FIG. 1A depicts an example gaming console.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Referring to FIG. 1, there is shown game console 176 which may be, for example, a Windows computing device, a Unix computing device, a Linux computing device, an Apple OSX computing device, an Apple iOS computing device, an Android computing device, a Microsoft Xbox, a Sony Playstation, a Nintendo Wii, or the like. The example game console 176 comprises a radio 126, a network interface 130, a video interface 132, an audio interface 134, a southbridge 150, a main system on chip (SoC) 148, a memory 162, an optical drive 172, and a storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various busses/links 112, 138, 140, 142, 144, 146, 152, 136, 160, 168, and 170.

The southbridge 150 comprises circuitry that supports one or more data bus protocols such as High-Definition Multimedia Interface (HDMI), Universal Serial Bus (USB), Serial Advanced Technology Attachment 2 (SATA 2), embedded multimedia card interface (e.MMC), Peripheral Component Interconnect Express (PCIe), or the like. The southbridge 150 may receive audio and/or video from an external source via link 112 (e.g., HDMI), from the optical drive (e.g., Blu-Ray) 172 via link 168 (e.g., SATA 2), and/or from storage 174 (e.g., hard drive, FLASH memory, or the like) via link 170 (e.g., SATA 2 and/or e.MMC). Digital audio and/or video is output to the SoC 148 via link 136 (e.g., CEA-861-E compliant video and IEC 61937 compliant audio). The southbridge 150 exchanges data with radio 126 via link 138 (e.g., USB), with external devices via link 140 (e.g., USB), with the storage 174 via the link 170, and with the SoC 148 via the link 152 (e.g., PCIe).

The radio 126 comprises circuitry operable to communicate in accordance with one or more wireless standards such as the IEEE 802.11 family of standards, the Bluetooth family of standards, and/or the like.

The network interface 130 may comprise circuitry operable to communicate in accordance with one or more wired standards and to convert between wired standards. For example, the network interface 130 may communicate with the SoC 148 via link 142 using a first standard (e.g., PCIe)

and may communicate with the network 106 using a second standard (e.g., gigabit Ethernet).

The video interface 132 may comprise circuitry operable to communicate video in accordance with one or more wired or wireless video transmission standards. For example, the video interface 132 may receive CEA-861-E compliant video data via link 144 and encapsulate/format/etc., the video data in accordance with an HDMI standard for output to the monitor 108 via an HDMI link 120.

The audio interface 134 may comprise circuitry operable to communicate audio in accordance with one or more wired or wireless audio transmission standards. For example, the audio interface 134 may receive CEA-861-E compliant video data via link 144 and encapsulate/format/etc. the video data in accordance with an HDMI standard for output to the monitor 108 via an HDMI link 120.

The central processing unit (CPU) 154 may comprise circuitry operable to execute instructions for controlling/coordinating the overall operation of the game console 176. Such instructions may be part of an operating system of the console and/or part of one or more software applications running on the console.

The graphics processing unit (GPU) 156 may comprise circuitry operable to perform graphics processing functions such as compression, decompression, encoding, decoding, 3D rendering, and/or the like.

The audio processing unit (APU) 158 may comprise circuitry operable to perform audio processing functions such as volume/gain control, compression, decompression, encoding, decoding, surround-sound processing, and/or the like to output single channel or multi-channel (e.g., 2 channels for stereo or 5, 7, or more channels for surround sound) audio signals. The APU 158 comprises memory (e.g., volatile and/or nonvolatile memory) 159 which stores parameter settings that affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may be modified via a graphical user interface (GUI) of the console and/or via an application programming interface (API) provided by the console 176.

The cache memory 164 comprises high-speed memory (typically DRAM) for use by the CPU 154, GPU 156, and/or APU 158. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher-speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to a user interface device 102, a user interface device 104, a network 106, a monitor 108, and audio subsystem 110.

Each of the user interface devices 102 and 104 may comprise, for example, a game controller, a keyboard, a motion sensor/position tracker, or the like. The user interface device 102 communicates with the game console 176 wirelessly via link 114 (e.g., Wi-Fi Direct, Bluetooth, and/or the like). The user interface device 102 communicates with the game console 176 via the wired link 140 (e.g., USB or the like).

The network 160 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuitry. The game console 176 sends audio to the subsystem 110 via link(s) 122 (e.g., S/PDIF for digital audio or "line out" for analog audio). Additional details of an example audio subsystem 110 are described below.

Figure 1B:
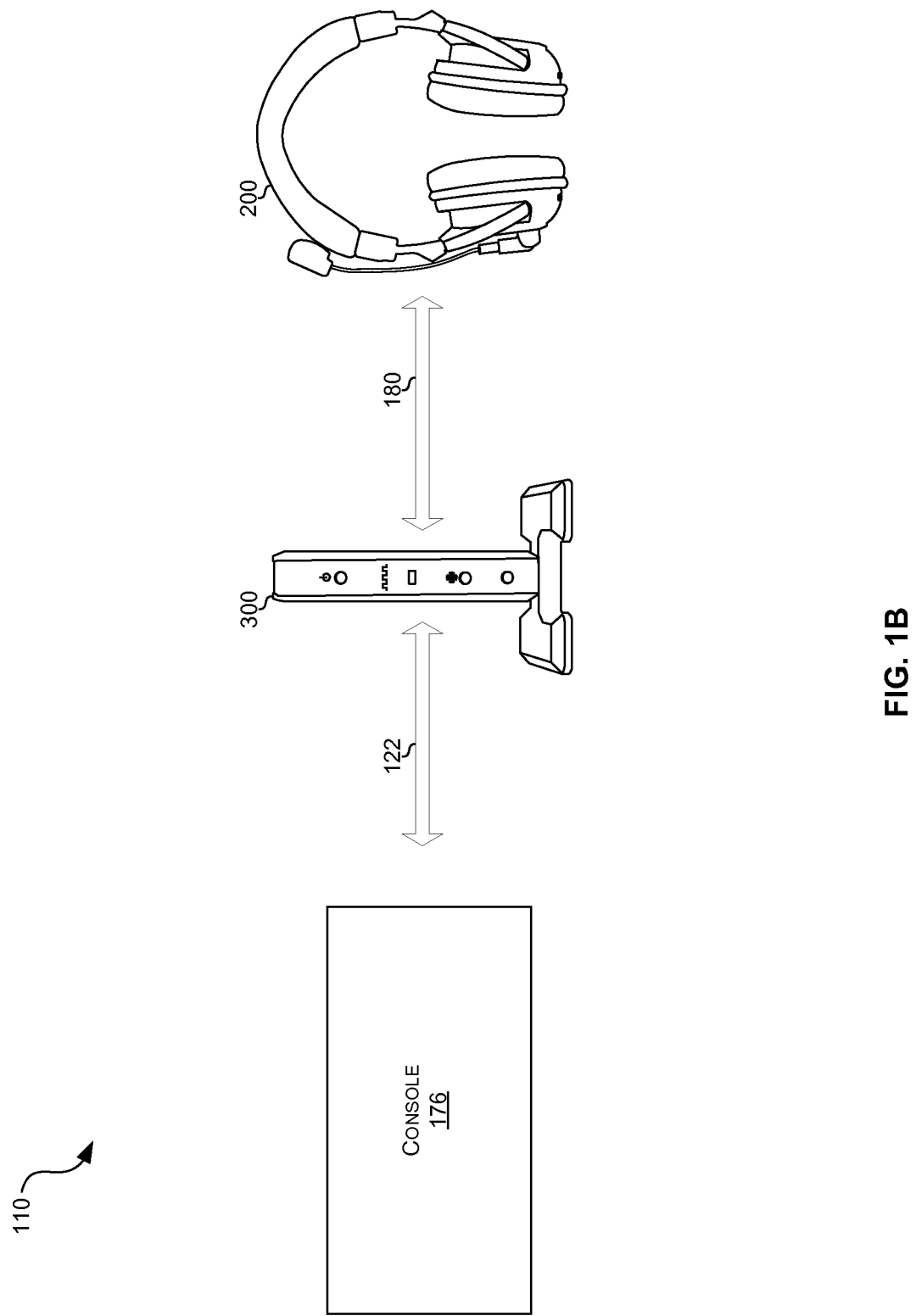
FIG. 1B depicts an example gaming audio subsystem comprising a headset and an audio basestation.
Figure 1C:
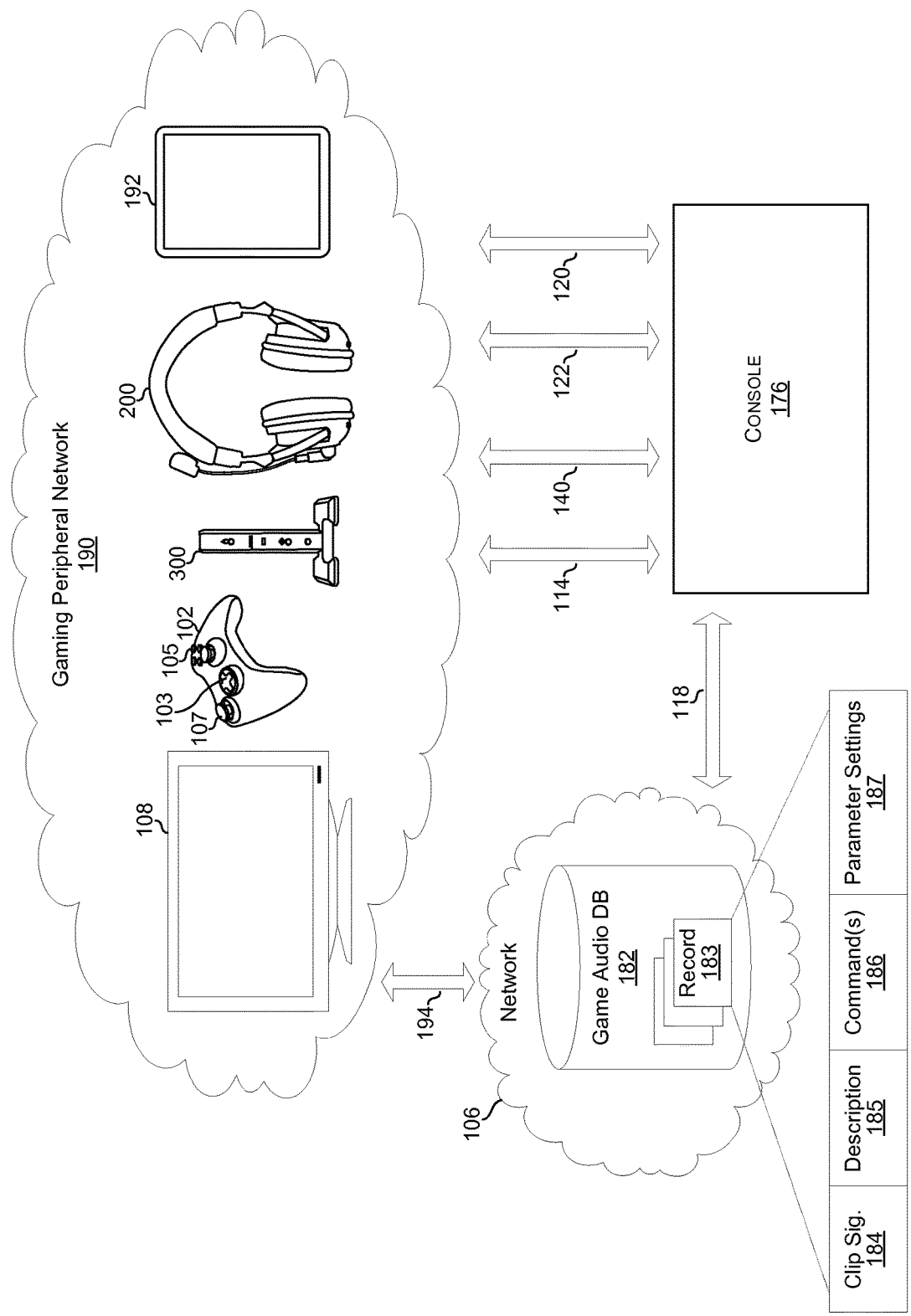
FIG. 1C depicts the example gaming console and an associated network of peripheral devices.

FIG. 1B depicts an example gaming audio subsystem comprising a headset and an audio basestation. Shown is a headset 200 and an audio basestation 300. The headset 200 communicates with the basestation 300 via a link 180 and the basestation 300 communicates with the console 176 via a link 122. The link 122 may be as described above. In an example implementation, the link 180 may be a proprietary wireless link operating in an unlicensed frequency band. The headset 200 may be as described below with reference to FIGS. 2A-2C. The basestation 300 may be as described below with reference to FIGS. 3A-3B.

Referring to FIG. 1C, again shown is the console 176 connected to a plurality of peripheral devices and a network 106. The example peripheral devices shown include a monitor 108, a user interface device 102, a headset 200, an audio basestation 300, and a multi-purpose device 192.

The monitor 108 and user interface device 102 are as described above. An example implementation of the headset 200 is described below with reference to FIGS. 2A-2C. An example implementation of the audio basestation is described below with reference to FIGS. 3A-3B.

The multi-purpose device 192 may be, for example, a tablet computer, a smartphone, a laptop computer, or the like and that runs an operating system such as Android, Linux, Windows, iOS, OSX, or the like. An example implementation of the multi-purpose device 192 is described below with reference to FIG. 4. Hardware (e.g., a network adaptor) and software (i.e., the operating system and one or more applications loaded onto the device 192) may configure the device 192 for operating as part of the GPN 190. For example, an application running on the device 192 may cause display of a graphical user interface via which a user can access gaming-related data, commands, functions, parameter settings, etc. and via which the user can interact with the console 176 and the other devices of the GPN 190 to enhance his/her gaming experience.

The peripheral devices 102, 108, 192, 200, 300 are in communication with one another via a plurality of wired and/or wireless links (represented visually by the placement of the devices in the cloud of GPN 190). Each of the peripheral devices in the gaming peripheral network (GPN) 190 may communicate with one or more others of the peripheral devices in the GPN 190 in a single-hop or multi-hop fashion. For example, the headset 200 may communicate with the basestation 300 in a single hop (e.g., over a proprietary RF link) and with the device 192 in a single hop (e.g., over a Bluetooth or Wi-Fi direct link), while the tablet may communicate with the basestation 300 in two hops via the headset 200. As another example, the user interface device 102 may communicate with the headset 200 in a single hop (e.g., over a Bluetooth or Wi-Fi direct link) and with the device 192 in a single hop (e.g., over a Bluetooth or Wi-Fi direct link), while the device 192 may communicate with the headset 200 in two hops via the user interface device 102. These example interconnections among the peripheral devices of the GPN 190 are merely examples, any number and/or types of links among the devices of the GPN 190 is possible.

The GPN 190 may communicate with the console 176 via any one or more of the connections 114, 140, 122, and 120 described above. The GPN 190 may communicate with a network 106 via one or more links 194 each of which may be, for example, Wi-Fi, wired Ethernet, and/or the like.

A database 182 which stores gaming audio data is accessible via the network 106. The gaming audio data may comprise, for example, signatures of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 184 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one of more devices of the GPN 190.

Figure 2A:
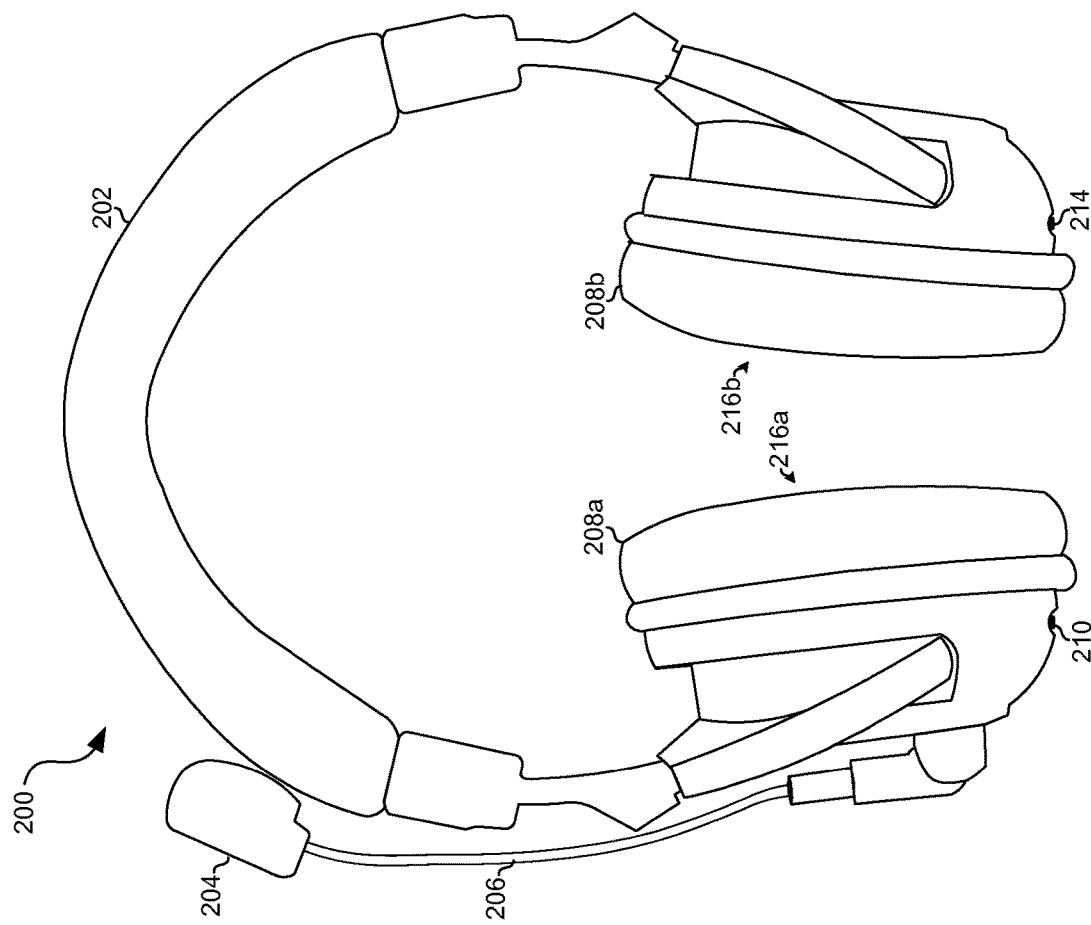
FIGS. 2A and 2B depict two views of an example embodiment of a networked gaming headset.
Figure 2B:
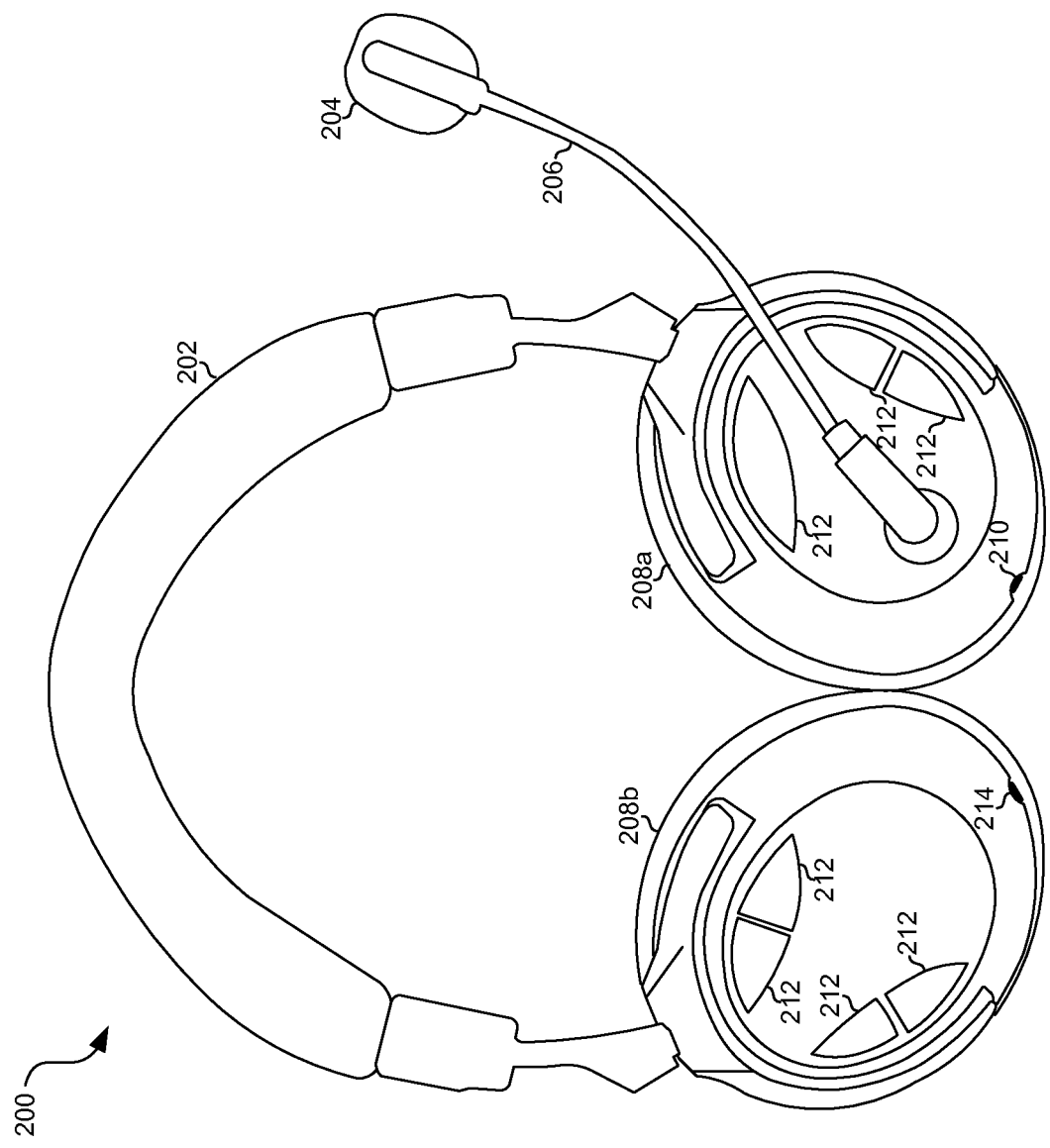

Referring to FIGS. 2A and 2B, there is shown two views of an example headset 200 that may present audio output by a gaming console such as the console 176. The headset 200 comprises a headband 202, a microphone boom 206 with microphone 204, ear cups 208a and 208b which surround speakers 216a and 216b, connector 210, connector 214, and user controls 212.

The connector 210 may be, for example, a 3.5 mm headphone socket for receiving analog audio signals (e.g., receiving chat audio via an Xbox "talkback" cable).

The microphone 204 converts acoustic waves (e.g., the voice of the person wearing the headset) to electric signals for processing by circuitry of the headset and/or for output to a device (e.g., console 176, basestation 300, a smartphone, and/or the like) that is in communication with the headset.

The speakers 216a and 216b convert electrical signals to soundwaves.

The user controls 212 may comprise dedicated and/or programmable buttons, switches, sliders, wheels, etc. for performing various functions. Example functions which the controls 212 may be configured to perform include: power the headset 200 on/off, mute/unmute the microphone 204, control gain/volume of, and/or effects applied to, chat audio by the audio processing circuitry of the headset 200, control gain/volume of, and/or effects applied to, game audio by the audio processing circuitry of the headset 200, enable/disable/initiate pairing (e.g., via Bluetooth, Wi-Fi direct, or the like) with another computing device, and/or the like.

The connector 214 may be, for example, a USB port. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet compute, laptop computer, or the like.

Figure 2C:
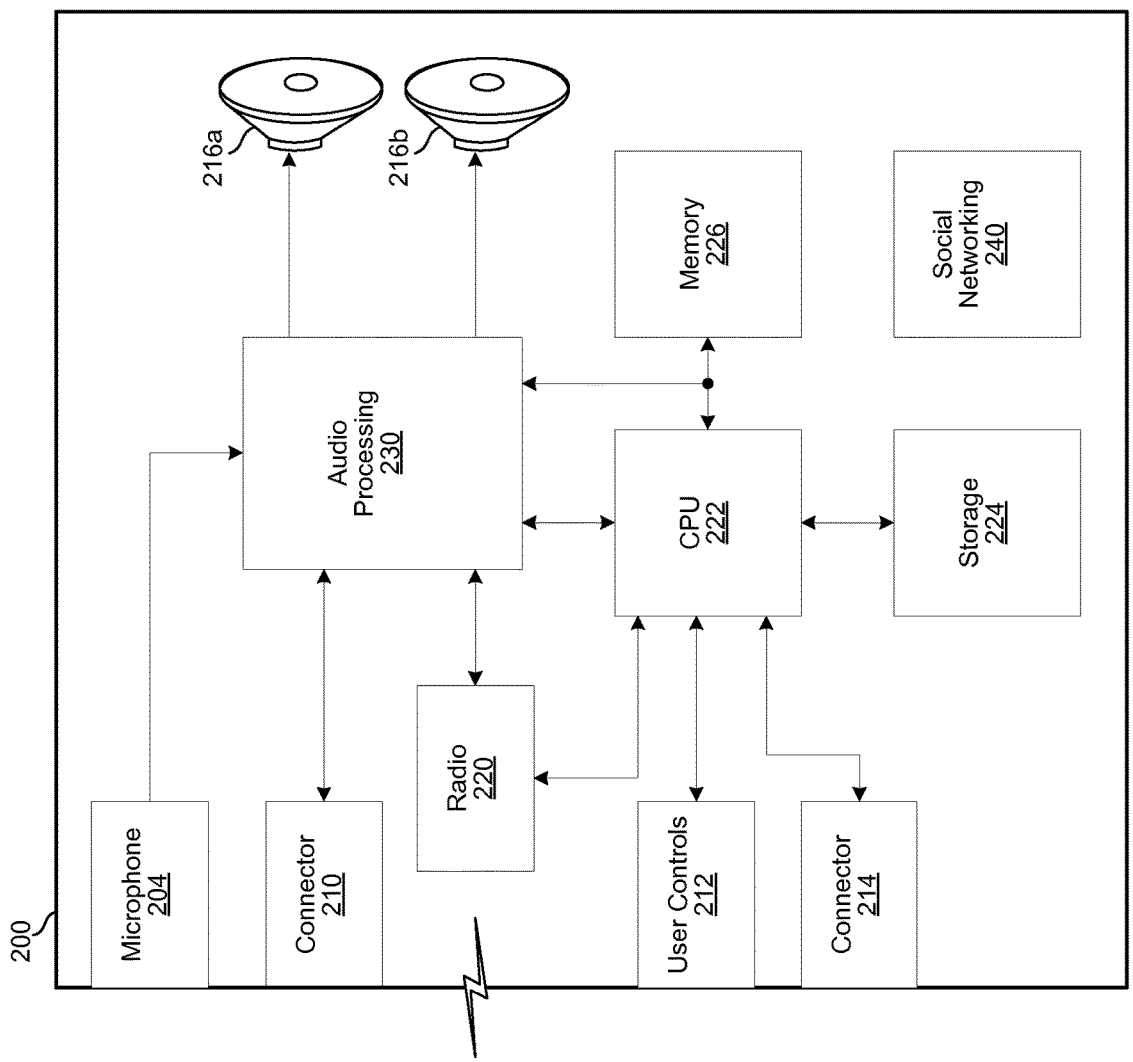
FIG. 2C depicts a block diagram of the example headset of FIGS. 2A and 2B.

FIG. 2C depicts a block diagram of the example headset 200. In addition to the connector 210, user controls 212, connector 214, microphone 204, and speakers 216a and 216b already discussed, shown are a radio 220, a CPU 222, a storage device 224, a memory 226, an audio processing circuit 230, and a social networking component 240.

The radio 220 may comprise circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for receiving audio from an audio basestation such as the basestation 300).

The CPU 222 may comprise circuitry operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The storage device 224 may comprise, for example, FLASH or other nonvolatile memory for storing data which may be used by the CPU 222 and/or the audio processing circuitry 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuitry 230. As another example, one or more parameter settings may determine, at least in part, a frequency response of one or more filters that operate on audio signals in the audio processing circuitry 230. As another example, one or more parameter settings may determine, at least in part, whether and which sound effects are added to audio signals in the audio processing circuitry 230 (e.g., which effects to add to microphone audio to morph the user's voice). Example parameter settings which affect audio processing are described in the co-pending U.S. patent application Ser. No. 13/040,144 titled "Networked gaming headset with Programmable Audio" and published as US2012/0014553, the entirety of which is hereby incorporated herein by reference. Particular parameter settings may be selected autonomously by the headset 200 in accordance with one or more algorithms, based on user input (e.g., via controls 212), and/or based on input received via one or more of the connectors 210 and 214.

The memory 226 may comprise volatile memory used by the CPU 230 and/or audio processing circuit 230 as program memory, for storing runtime data, etc.

The audio processing circuit 230 may comprise circuitry operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing may be performed on game, chat, and/or microphone audio that is subsequently output to speaker 216a and 216b. Additionally, or alternatively, the processing may be performed on chat audio that is subsequently output to the connector 210 and/or radio 220.

In an example implementation, the headset 200 may be configured as a networked gaming headset with automatic social networking—i.e., to support network access and use thereof in conjunction with operation of the headset. For example, the headset 200 may be configurable to utilize network accessibility to store, share, and/or obtain information relating to use or operation of the headset 200, particularly during multi-player online gaming.

In one particular use scenario, configuring the headset 200 as a networked gaming headset may comprise supporting automatic social networking. In this regard, audio (input and/or output) in the headset 200 may be monitored, and upon detection of particular audio content (e.g., a recognized sound, voice, etc.), a corresponding social networking update (e.g., tweet, Facebook status update, etc.) may be triggered and/or generated. An example of such automatic social networking use scenario is described in more detail with respect to, for example, FIG. 5.

To support configuring and/or operation of the headset 200 as a network networked gaming headset, dedicated components may be incorporated into (and used in) the headset 200, and/or existing components may be modified or adjusted. In the example implementation shown in FIG. 2C, the headset 200 incorporates the dedicated social networking component 240 for supporting automatic social networking. The social networking component 240 may comprise suitable circuitry for performing and/or managing automatic social networking related operations or functions in the headset 200. For example, the social networking component 240 may be configured for setting triggering criteria, determining when social networking updates may be triggered based thereon, generating (or triggering generation of) the corresponding social networking updates, and/or determining target recipients of these updates. In another example implementation, the functions of the social networking component 240 may be integrated into the other components (e.g., CPU 222) of the headset 200.

Figure 3A:
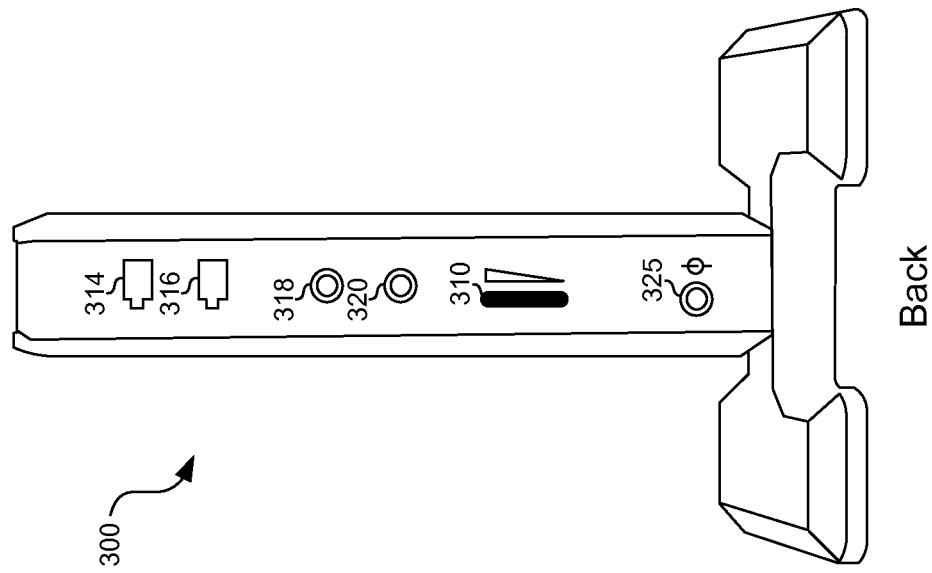
FIG. 3A depicts two views of an example embodiment of an audio basestation.
Figure 3A:
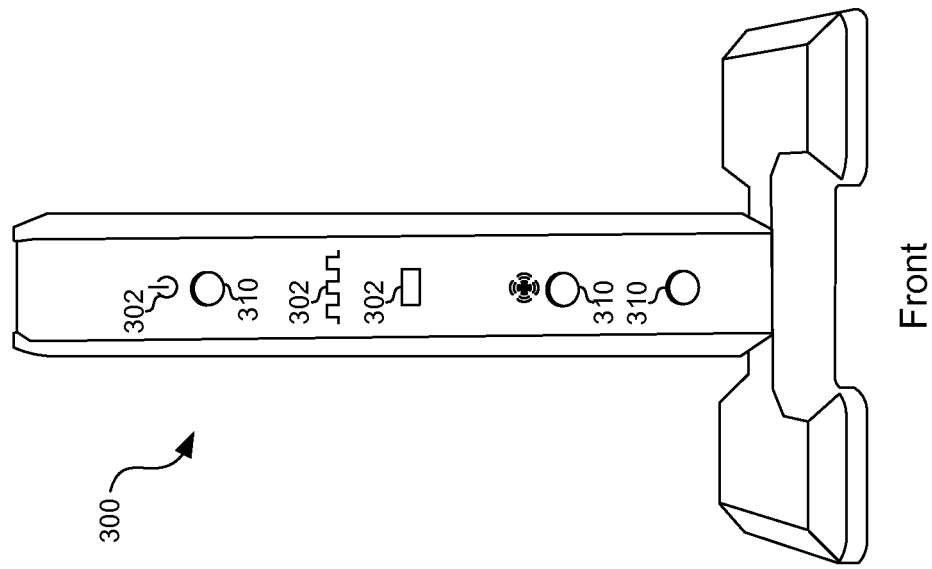

FIG. 3A depicts two views of an example embodiment of the audio basestation 300. The basestation 300 comprises status indicators 302, user controls 310, power port 325, and audio connectors 314, 316, 318, and 320.

The audio connectors 314 and 316 may comprise digital audio in and digital audio out (e.g., S/PDIF) connectors, respectively. The audio connectors 318 and 320 may comprise a left "line in" and a right "line in" connector, respectively. The controls 310 may comprise, for example, a power button, a button for enabling/disabling virtual surround sound, a button for adjusting the perceived angles of the speakers when the virtual surround sound is enabled, and a dial for controlling a volume/gain of the audio received via the "line in" connectors 318 and 320. The status indicators 302 may indicate, for example, whether the audio basestation 300 is powered on, whether audio data is being received by the basestation 300 via connectors 314, and/or what type of audio data (e.g., Dolby Digital) is being received by the basestation 300.

Figure 3B:
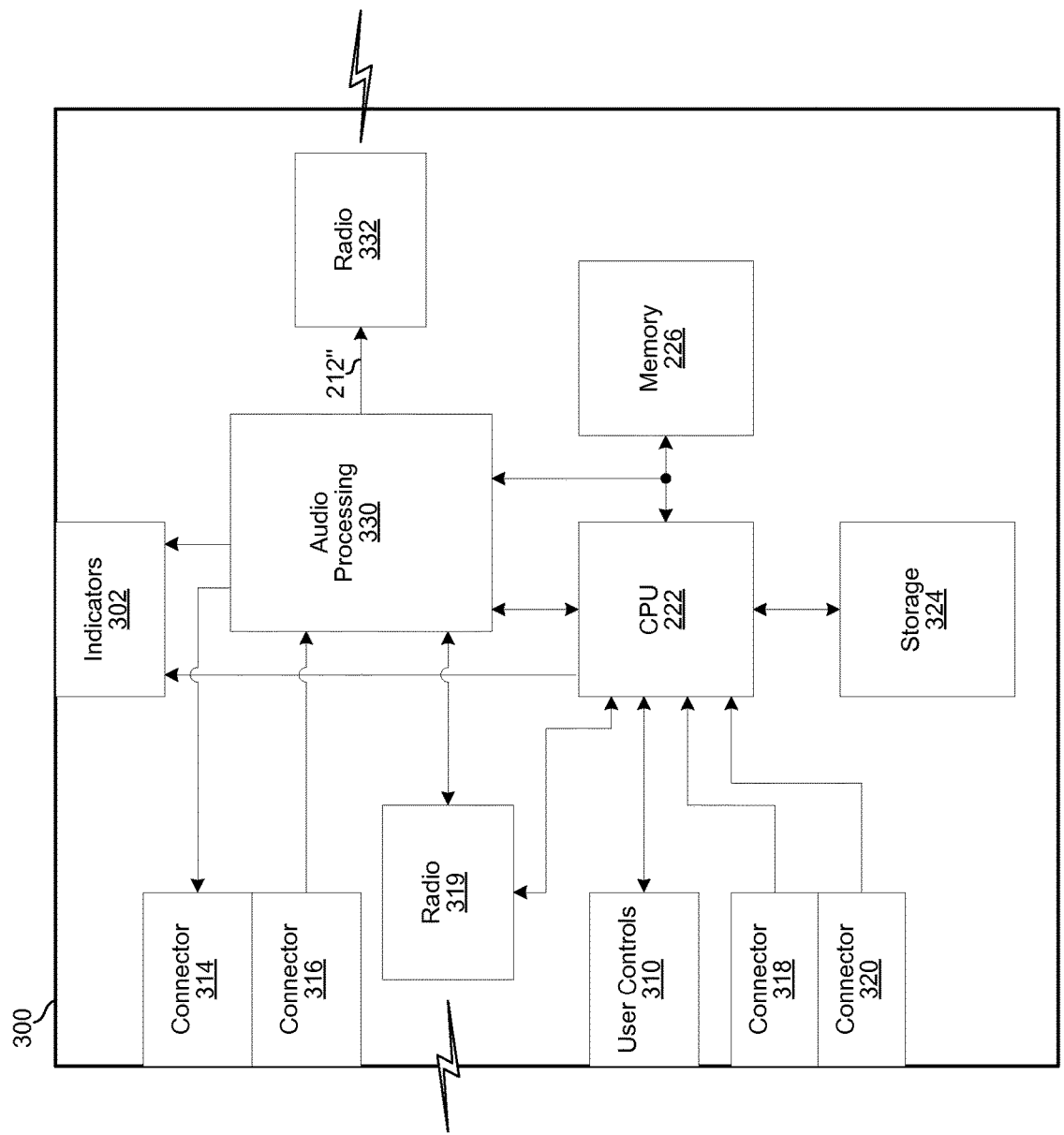
FIG. 3B depicts a block diagram of the audio basestation 400.

FIG. 3B depicts a block diagram of the audio basestation 300. In addition to the user controls 310, indicators 302, and connectors 314, 316, 318, and 320 described above, the block diagram additionally shows a CPU 322, a storage device 324, a memory 326, a radio 319, an audio processing circuit 330, and a radio 332.

The radio 319 comprises circuitry operable to communicate in accordance with one or more standardized (such as the IEEE 802.11 family of standards, the Bluetooth family of standards, and/or the like) and/or proprietary (e.g., proprietary protocol for receiving audio protocols for receiving audio from a console such as the console 176) wireless protocols.

The radio 332 comprises circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for transmitting audio to headphones 200).

The CPU 322 comprises circuitry operable to execute instructions for controlling/coordinating the overall operation of the audio basestation 300. Such instructions may be part of an operating system or state machine of the audio basestation 300 and/or part of one or more software applications running on the audio basestation 300. In some implementations, the CPU 322 may be, for example, a programmable interrupt controller, a state machine, or the like.

The storage 324 may comprise, for example, FLASH or other nonvolatile memory for storing data which may be used by the CPU 322 and/or the audio processing circuitry 330. Such data may include, for example, parameter settings that affect processing of audio signals in the basestation 300. For example, one or more parameter settings may determine, at least in part, a gain of one or gain elements of the audio processing circuitry 330. As another example, one or more parameter settings may determine, at least in part, a frequency response of one or more filters that operate on audio signals in the audio processing circuitry 330. As another example, one or more parameter settings may determine, at least in part, whether and which sound effects are added to audio signals in the audio processing circuitry 330 (e.g., which effects to add to microphone audio to morph the user's voice). Example parameter settings which affect audio processing are described in the co-pending U.S. patent application Ser. No. 13/040,144 titled "Networked gaming headset with Programmable Audio" and published as US2012/0014553, the entirety of which is hereby incorporated herein by reference. Particular parameter settings may be selected autonomously by the basestation 300 in accordance with one or more algorithms, based on user input (e.g., via controls 310), and/or based on input received via one or more of the connectors 314, 316, 318, and 320.

The memory 326 may comprise volatile memory used by the CPU 322 and/or audio processing circuit 330 as program memory, for storing runtime data, etc.

The audio processing circuit 330 may comprise circuitry operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 330 may be determined, at least in part, by which parameter settings have been selected. The processing may be performed on game and/or chat audio signals that are subsequently output to a device (e.g., headset 200) in communication with the basestation 300. Additionally, or alternatively, the processing may be performed on a microphone audio signal that is subsequently output to a device (e.g., console 176) in communication with the basestation 300.

Figure 4:
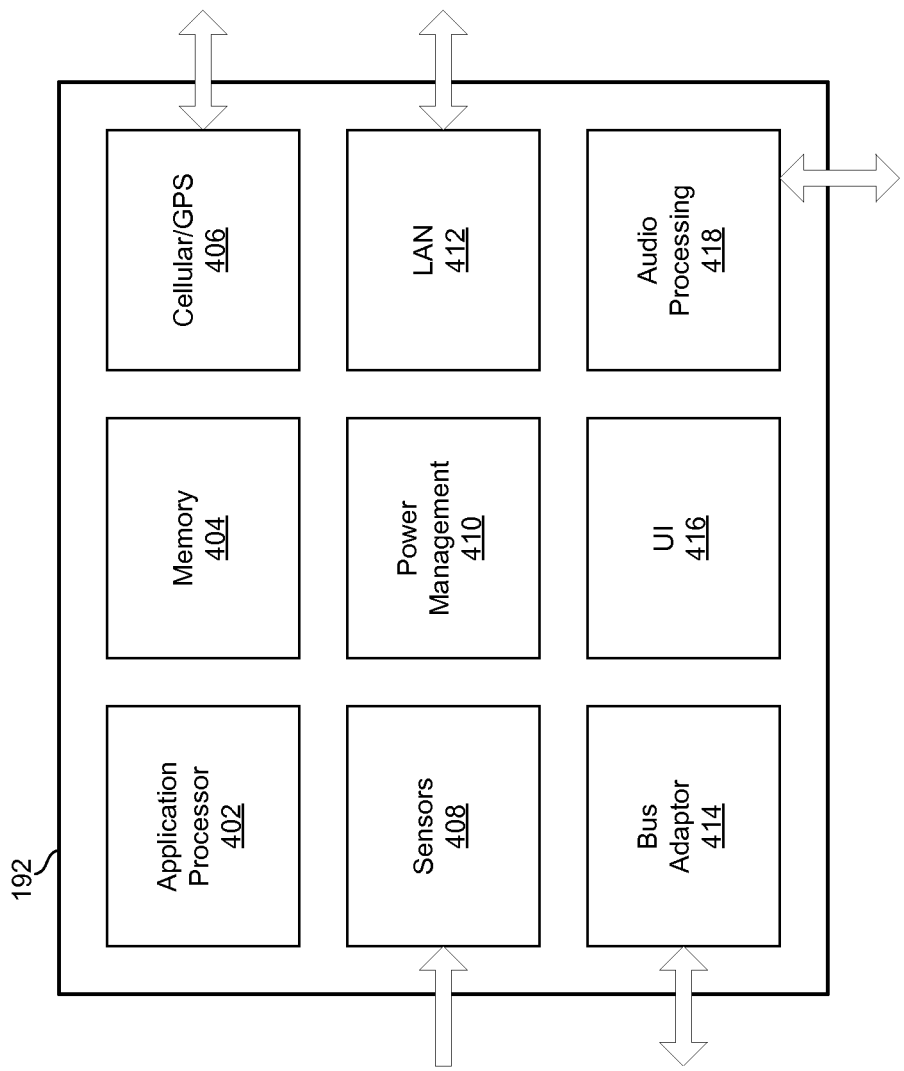
FIG. 4 depicts a block diagram of an example multipurpose device.

FIG. 4 depicts a block diagram of an example multipurpose device 192. The example multi-purpose device 192 comprises a an application processor 402, memory subsystem 404, a cellular/GPS networking subsystem 406, sensors 408, power management subsystem 410, LAN subsystem 412, bus adaptor 414, user interface subsystem 416, and audio processor 418.

The application processor 402 comprises circuitry operable to execute instructions for controlling/coordinating the overall operation of the multi-purpose device 192 as well as graphics processing functions of the multi-purpose device 402. Such instructions may be part of an operating system of the multi-purpose device 192 and/or part of one or more software applications running on the multi-purpose device 192.

The memory subsystem 404 comprises volatile memory for storing runtime data, nonvolatile memory for mass storage and long-term storage, and/or a memory controller which controls reads writes to memory.

The cellular/GPS networking subsystem 406 comprises circuitry operable to perform baseband processing and analog/RF processing for transmission and reception of cellular and GPS signals.

The sensors 408 comprise, for example, a camera, a gyroscope, an accelerometer, a biometric sensor, and/or the like.

The power management subsystem 410 comprises circuitry operable to manage distribution of power among the various components of the multi-purpose device 192.

The LAN subsystem 412 comprises circuitry operable to perform baseband processing and analog/RF processing for transmission and reception of wired, optical, and/or wireless signals (e.g., in accordance Wi-Fi, Wi-Fi Direct, Bluetooth, Ethernet, and/or the other standards).

The bus adaptor 414 comprises circuitry for interfacing one or more internal data busses of the multi-purpose device with an external bus (e.g., a Universal Serial Bus) for transferring data to/from the multi-purpose device via a wired connection.

The user interface subsystem 416 comprises circuitry operable to control and relay signals to/from a touchscreen, hard buttons, and/or other input devices of the multi-purpose device 192.

The audio processor 418 comprises circuitry to process (e.g., digital to analog conversion, analog-to-digital conversion, compression, decompression, encryption, decryption, resampling, etc.) audio signals. The audio processor 418 may be operable to receive and/or output signals via a connector such as a 3.5 mm stereo and microphone connector.

Figure 5:
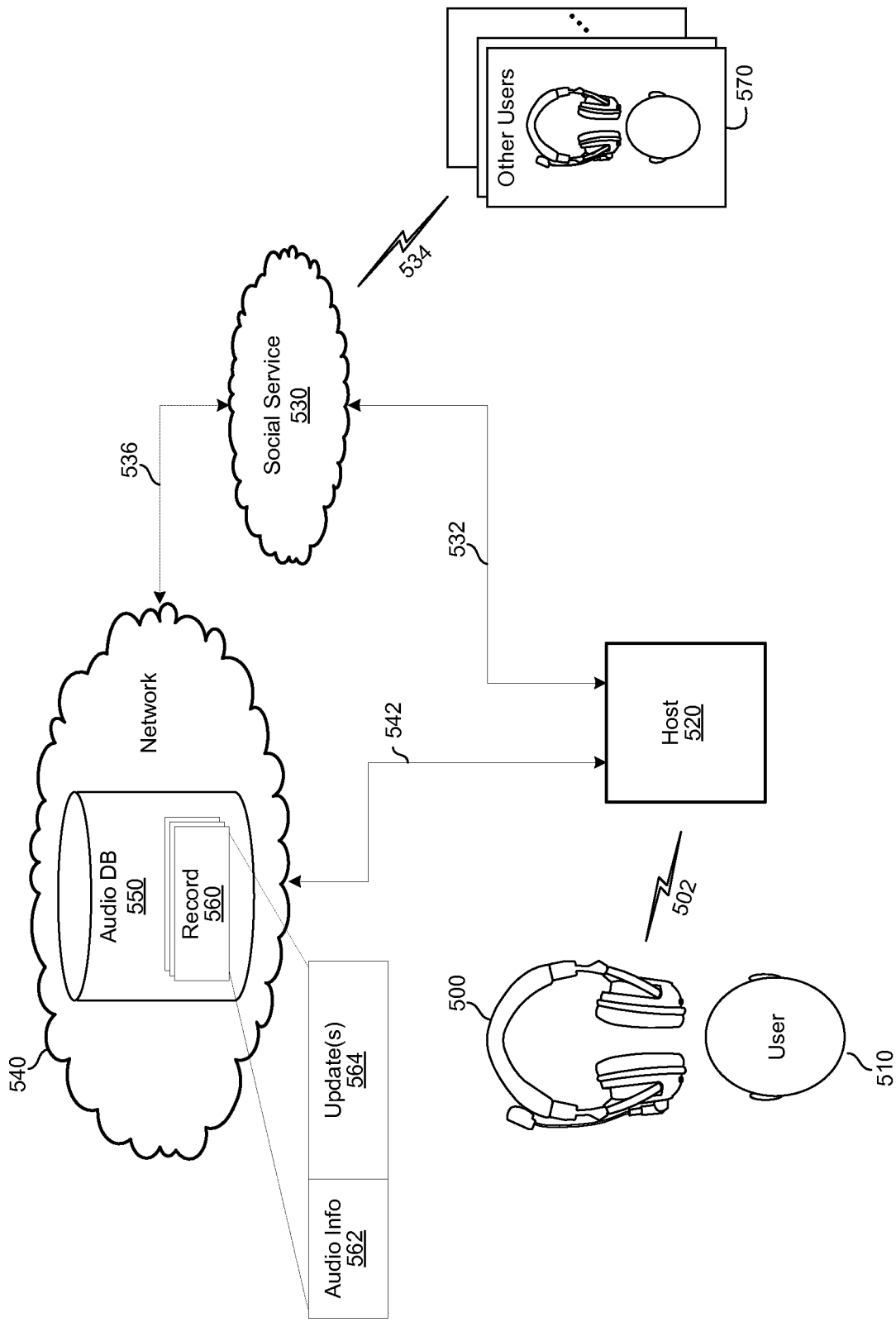
FIG. 5 depicts a block diagram illustrating use of networked gaming headset during automatic social networking.

FIG. 5 depicts a block diagram illustrating use of a networked gaming headset during automatic social networking Referring to FIG. 5, there is shown a headset 500, a host 520, a social service 530, and a network 540.

The headset 500 may be similar to the headset 200, for example. In this regard, the headset 500 may facilitate processing of audio and outputting the audio (e.g., via speakers of the headsets) to a user 510 wearing the headset 500. Furthermore, headset 500 may also be utilized in capturing audio (e.g., via microphones) from the user 510, processing the audio input, and, in some instances, communicating the audio (e.g., to other users, such as during online gaming).

The headset 500 may be coupled to the host 520 (e.g., via a connection 502). The host 520 may comprise suitable circuitry for supporting use and/or operation of headsets (e.g., the headset 500). For example, the host 520 may be configured for providing or supporting functions such as processing (audio and/or non-audio), storage, networking, and the like, which may be needed or desired during use and/or operation of the headset 500. In an example embodiment, the host 520 may correspond to (at least a portion of) a combination of a game console (e.g., similar to the game console 176) and a basestation (e.g., similar to the basestation 300), with the connection 502 comprising a wireless link (e.g., similar to the link 180). The disclosure is not so limited, however, and in some instances the host 520 may correspond to any suitable electronic device or system which may be configured to perform any of the operations or functions described with respect to the host 520.

In operation, the combination of headset 500/host 520 may be operable to support processing and/or communication of audio associated with the user/player 510, such as during multi-player online gaming, for example. In some instances, the headset 500 may be configured as a networked gaming headset. Networked gaming headsets may use their network connections during operations of the headsets, such as to store, share, and/or obtain information. For example, a networked gaming headset may be configured to communicate data to and/or from other hosts, headsets, etc., of other players during (and/or relating to) online gaming, using network connections available to the headset—e.g., direct connections (i.e., using peer-to-peer connection) and/or indirect connections (i.e., via intermediary networks, media, and/or systems).

In the particular example use scenario shown in FIG. 5, the headset 500 may support automatic social networking. In this regard, with automatic social networking, updates may be communicated via social networking services based on audio processed in the headsets. For example, audio (game, chat, and/or microphone) in the headset 500 may be monitored for audio content meeting particular criteria. The particular criteria may include, for example: identity of a talker whose voice is present in the audio; presence of particular sounds words, and/or phrases (e.g., particular sounds, words, or phrases associated in a data structure with a particular player/headset user, a particular game, a particular game character, a particular game level or scenario, etc.); conditions associated with the audio (e.g., timing between sounds, etc.), and the like. When audio matching one or more of the particular criteria is detected, a corresponding social networking update may be automatically triggered and/or generated by the headset 500. Recipient(s) of the social networking updates may be automatically selected, such as based on particular selection criteria. For example, the social networking updates may be communicated only to other players participating in the same online (multiplayer) chat in which the user/player 510 is participating.

The social networking updates may be triggered in, and broadcast or communicated 534 by, for example, the social service 530. In this regard, the social service 530 may comprise any suitable service that may be utilized to provide social networking among a plurality of users 570. Examples of social services may comprise web-based social services, such as Twitter, Facebook, Instagram, blogs or social boards and/or the like. Accordingly, triggered social networking updates may comprise Tweet(s), Facebook status update(s), Instagram posts, blog posts, social board posts and/or the like. The disclosure, however, is not limited to any particular type of social services.

In some instances, communication of the social networking updates (including users 570 matching any applicable selection criteria) may further require additional checks—e.g., proper validation. For example, the social service 530 may require validation of users 570 before allowing triggering or communication of social networking updates to those users. The validation of the players may be based on, for example, successful login to the social service 530. For example, the social service 530 may be configured to require, before enabling triggering of social network updates, or communication 534 of the updates to particular users 570, subscription by those users to social service 530 (or a particular application thereof—e.g., an application associated with updates based on use of headsets), and successfully logging into the social service 530—e.g., by providing correct login information which may be required by the social service 530 (e.g., user name, user id, password, etc.).

In one particular example embodiment, automatic social networking may comprise use of a centralized depository (e.g., database), such as for storing data relating to automatic social networking and/or to related operations or functions. For example, the centralized depository may be used for storing data relating to triggering criteria—i.e., specifying conditions under which audio would trigger social networking updates, and/or to the corresponding social networking updates themselves. Such centralized depository may be accessible by a plurality of users. Further, in some instances, the centralized depository, or the data stored therein, may be associated with plurality of different scenarios—e.g., a plurality of different video games and/or a plurality of different players/users. Accordingly, different criteria for triggering social networking updates may be specified for each particular scenario. Thus, only pertinent (applicable) information may be obtained or downloaded from the centralized depository—e.g., based on the particular game being played and/or the particular user playing the game. In the particular example use scenario shown in FIG. 5, the network 540 may be utilized to provide the (centralized) database, and functions related thereto.

The network 540 may be configured on a plurality of hardware resources (e.g., storage elements, processing elements, routing elements, etc.), using suitable software (and firmware) solutions, such as for managing operations of the network 540, and/or for controlling or supporting applications or functions associated with the network 540. The network 540 may be configured to support such functions as remote storage and/or retrieval of data. For example, the network 540 may comprise an audio database 550, which may be used in storing (and subsequently allowing downloading) of audio-based data, particularly data relating to certain applications involving audio and/or handling thereof. Where the audio database 550 is used in conjunction with online gaming (e.g., storing automatic social networking related information associated with plurality of video games), the network 540 may correspond to the network 106 (and the database 550 may correspond to the database 182). In an example implementation, the audio database 550 may comprise a plurality of records 560.

The audio database 550 may be utilized in conjunction with automatic social networking. For example, the records 560 may be used to store data associated with different social networking update triggering actions. For example, each record 560 may comprises an audio information section 562 (specifying audio-based triggering criteria—e.g., speaker identity, particular audio content, particular triggering parameters, etc.) and an updates section 564 (specifying information pertaining to corresponding social networking updates—content of the updates, communication criteria or restrictions, etc.). The records 560 may be configured and/or modified by users (permitted to access and modify the database 550).

Accordingly, during operation of the headset 500, the host 520 may (e.g., based on input or commands from the headset 500) establish a network connection 542 to the network 540, and then utilize the network connection 542 to access the audio database 550, to download one or more records 560, for use in conjunction with automatic social networking operations. The particular downloaded record(s) 560 may be selected based on the applications for which the headset 500 is used. For example, the particular downloaded record(s) 560 may correspond to particular online multiplayer video game in which the user/player 510 is participating and/or to the particular user/player 510. Audio (input or output) handled by the headset 500 may then be monitored, to determine if there is any match with the triggering criteria specified in the audio sections 562 of the downloaded record(s) 560. When there is a match, the corresponding social networking update(s) may be triggered via the social service 530. In this regard, the headset 500/the host 520 may establish a network connection 532 to the social service 530, for use in triggering the update(s).

In an example implementation, the headset 500 and/or the host 520 may communicate to the social service 530 (using the network connection 532) information pertaining to the update(s), such as based on the updates section 564 of the downloaded record(s) 560. For example, the headset 500 may be configured to run a client application that is operable to interact with the social service 530 via an application programming interface (API) of the social service 530.

In another example implementation, the headset 500 and/or the host 520 may simply specify the applicable database record(s), and the social service 530 may then establish a network connection 536 to the network 540, utilize the network connection 536 to access the audio database 550, to download the applicable records 560. For example, the headset 500 may interact with the database 550 via an API of the database 550 and the database 550 may interact with the social service 530 via an API of the social service 530.

FIG. 6 is a flowchart illustrating an example process for providing automatic social networking in networked gaming headset. Referring to FIG. 6, there is shown a flow chart 600, comprising a plurality of example steps.

In starting step 602, a headset (e.g., the headset 500) is powered on and/or set to an initial operating state, whereby the headset may be ready for outputting of audio (e.g., microphone audio) and/or handling of input audio (e.g., game and/or chat audio, captured via microphone of the headset).

In step 604, audio (output and/or input) is monitored during operation of the headset (e.g., during play of an online, multiplayer video game). The monitoring may be for audio meeting predefined criteria. Examples of such criteria comprise: identity of the talker associated with a voice in the audio, presence of particular sounds, words, and/or phrases in the audio, timing of the audio, and/or the like. The predefined criteria may be set and/or stored in a remote, centralized location (e.g., a networked database), from which they may be obtained/downloaded. The predefined criteria may be configured for plurality of different applications. For example, the predefined criteria may be associated with a plurality of different video games. Accordingly, when participating in particular game, only predefined criteria associated with that particular game are downloaded or obtained.

In step 606, it is determined whether at least one predefined criteria is matched. For example, it may be determined whether a speaker of an audio being outputted via the headset is a preselected speaker, or whether the audio comprises particular content (e.g., particular word or phrase). In instances where it is determined that there is no match, the process returns to step 604, to continue monitoring.

Returning to step 606, in instances where it is determined that there is a match, the process proceeds to step 608. In step 608, corresponding social network update(s) is/are triggered, based on the matched criteria. For example, the social networking update(s) may be triggered via a social service (e.g., Twitter, Facebook, or the like). The particular social network update(s) to be triggered may be determined based on the matched criteria. For example, where a networked database is utilized, the applicable social network update(s) may be specified in the entry in the network database corresponding to the particular matched criteria.

In step 610, the social networking updates are communicated to/made available to one or more particular (other) users. For example, the users may be selected based on selection criteria—e.g., participation in the same online video game). Also, communication of the social networking updates to users (including ones matching the selection criteria) may further require additional checks—e.g., proper validation, such as based on successful login to the social service.

As an example to help illustrate, in block 606 a particular sound associated with passing a certain milestone in a particular game may be detected, in block 608 corresponding text for a social service update (e.g., "I just beat [character name] in [game name]") may be generated and/or retrieved from a data structure (e.g., in storage 324 or audio database 550), and in block 610 the text may be posted to player's feed/profile in the social service 530.

As another example to help illustrate, in block 606 the headset 500 may recognize the voice of John Doe and recognize a sound associated with GameX, in block 608 corresponding text for a social service update (e.g., "Playing Game X with John Doe") may be generated and/or retrieved from a data structure (e.g., in storage 324 or audio database 550), and in block 610 the text may be posted to the headset user's feed/profile in the social service 530.

Various example embodiments of the invention may comprise a system and a method for a networked gaming headset with automatic social networking. For example, in an audio setup (e.g., combination of headset 500/host 520) comprising at least one audio headset (e.g., the headset 500) which may be configurable to process audio for a player (e.g., user/player 510) when that player is participating in an online multiplayer game, input audio and/or output audio in the audio headset may be monitored. When the audio matches one or more triggering criteria, one or more update messages may be triggered via a social networking service (e.g., the social service 530). The one or more triggering criteria may comprise (or be set based on) the identity of a speaker, content of the audio, and/or conditions association with the audio. In some instances, the one or more triggering criteria may be associated with a particular application (e.g., the online video game in which the player is participating). In some instance, the audio setup may interact with a remote audio database (e.g., the audio database 550, accessed via the network 540), which may be used in storing data relating to triggering update messages. The remote audio database may comprise data relating to triggering update messages based on audio associated with a plurality of different applications (e.g., a plurality of video games). The remote audio database may comprise a plurality of entries (e.g., records 560), with each entry comprising data specifying a particular set of triggering criteria (e.g., the audio subsection 562) and/or data relating to one or more corresponding update messages (e.g., the updates subsection 564). The audio setup may download from the remote audio database, based on the online multiplayer game, data for determining the one or more triggering criteria and/or the update message. The update message may be made available, via the social networking service, to one or more particular other users (e.g., other users 570). In this regard, the one or more particular other users may be selected based on matching one or more user selection criteria and/or based on successful user validation. The one or more user selection criteria may comprise participation in the online multiplayer game.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:
in an audio headset that is configurable to process audio for a player participating in an online multiplayer game:
setting one or more triggering criteria for the online multiplayer game based on an identity of a speaker, wherein the one or more triggering criteria are associated with a particular social networking service;
monitoring input audio and/or output audio handled in the audio headset during the online multiplayer game;
detecting when the audio matches the one or more triggering criteria; and
when there is a match, transmitting a signal to a multi-purpose device to trigger a post of an update message via the social networking service, wherein the audio headset comprises an interface operable to communicate with the multi-purpose device.

2. The method of claim 1, comprising setting the one or more triggering criteria based on content of the audio and/or conditions association with the audio.

3. The method of claim 1, comprising interacting with a remote audio database that is used for storing data relating to triggering update messages.

4. The method of claim 3, wherein the remote audio database comprises data relating to triggering update messages based on audio associated with a plurality of different video games.

5. The method of claim 3, wherein the remote audio database comprises a plurality of entries, with each entry comprising data specifying a particular set of triggering criteria and/or data relating to one or more corresponding update messages.

6. The method of claim 3, comprising downloading from the remote audio database, based on the online multiplayer game, data for determining the one or more triggering criteria and/or the update message.

7. The method of claim 1, comprising making the update message available, via the social networking service, to one or more particular other users.

8. The method of claim 7, comprising selecting the one or more particular other users based on matching one or more user selection criteria and/or based on successful user validation.

9. The method of claim 8, wherein the one or more user selection criteria comprise participation in the online multiplayer game.

10. The method of claim 1, wherein the multi-purpose device is a smartphone.

11. A system, comprising:
an audio headset that is configurable to process audio for a first player participating in an online multiplayer game, wherein the audio headset comprises an interface operable to communicate with a multi-purpose device, and wherein the audio headset is operable to:
set one or more triggering criteria for the online multiplayer game based on an identity of a speaker, wherein the one or more triggering criteria are associated with a particular social networking service;
monitor input audio and/or output audio handled in the audio headset during the online multiplayer game;
detect when the audio matches the one or more triggering criteria; and
when there is a match, transmit a signal to the multi-purpose device to trigger a post of an update message via a social networking service.

12. The system of claim 11, wherein the one or more triggering criteria are set based on content of the audio and/or conditions association with the audio.

13. The system of claim 11, wherein the system is operable to interact with a remote audio database that is used in storing data relating to triggering update messages.

14. The system of claim 13, wherein the remote audio database comprises data relating to triggering update messages based on audio associated with a plurality of different video games.

15. The system of claim 13, wherein the remote audio database comprises a plurality of entries, with each entry comprising data specifying a particular set of triggering criteria and/or data relating to one or more corresponding update messages.

16. The system of claim 13, wherein the system is operable to from the remote audio database, based on the online multiplayer game, data for determining the one or more triggering criteria and/or the update message.

17. The system of claim 11, wherein the update message is received or accessed by one or more particular other users.

18. The system of claim 17, wherein the one or more particular other users are selected based on matching one or more user selection criteria and/or based on successful user validation.

19. The system of claim 18, wherein the one or more user selection criteria comprise participation in the online multiplayer game.

20. The system of claim 11, wherein the multi-purpose device is a smartphone.

* * * * *